United States Patent [19]

Bothwell et al.

[11] Patent Number: 5,685,388

[45] Date of Patent: Nov. 11, 1997

[54] MOTORCYCLE WITH AN ENCLOSED BODY AND SUPPORT ASSEMBLY

[76] Inventors: Peter William Bothwell; Roy Bothwell, both of Meoncote, 114 Shipston Road, Stratford-on-Avon, Warwickshire CV37 7LR, England

[21] Appl. No.: 354,739

[22] Filed: Dec. 8, 1994

[30] Foreign Application Priority Data

Dec. 10, 1993 [GB] United Kingdom ............... 9325338

[51] Int. Cl.$^6$ ........................... B62J 17/06; B62H 1/12
[52] U.S. Cl. ................. 180/219; 280/293; 280/755; 296/78.1
[58] Field of Search ............... 180/219; 296/78.1; 280/293, 727, 755, 763.1

[56] References Cited

U.S. PATENT DOCUMENTS 4,157,739  6/1979  Frye ........................... 296/78.1 X
5,401,055  3/1995  Pham .......................... 280/755

FOREIGN PATENT DOCUMENTS 1055019  2/1954  France ........................ 180/219
71859    2/1960  France ........................ 280/293
1276291  6/1972  United Kingdom ............ 296/78.1

*Primary Examiner*—Brian L. Johnson
*Assistant Examiner*—Bridget Avery
*Attorney, Agent, or Firm*—Kenyon & Kenyon

[57] ABSTRACT

A motorcycle having an enclosed or substantially enclosed body and respective support members at the sides of the motor cycle and movable downwardly relative to the body into engagement with the ground, wherein each support member is in the form of an open-topped enclosure for receiving a lower portion of the respective leg of the rider with a footrest extending into such enclosure.

18 Claims, 9 Drawing Sheets

MOTORCYCLE WITH AN ENCLOSED BODY AND SUPPORT ASSEMBLY

BACKGROUND OF THE INVENTION

1. Field of the Invention

This invention relates to powered two-wheeled vehicles which will herein be referred to as motorcycles. Particularly the invention relates to motorcycles of the type having a totally or substantially totally enclosed body structure.

2. Description of Prior Art

There have been many proposals, some of which have reached production, for motor cycles having body work which encloses or substantially encloses the rider or riders for weather and accident protection. If such a body prevents the rider of a machine from placing his feet on the ground for stability when stationary or at low speeds, then it is necessary to provide some other means for providing stability under such conditions.

It has been proposed, in my British Patent No. 1 276 291, that a motor cycle having an enclosed body should be provided, adjacent the positions where a rider's feet rest in normal riding of the motorcycle, with movable support members which are able to be moved downwardly into engagement with the ground upon a pressure applied by the rider's feet. Such movable support members comprise a platform supported on a system of levers pivotal about an axis extending transversely of the motorcycle. Such platforms are disposed laterally outwardly of the normal footrest positions of the motorcycle, so that they make the motorcycle very wide and restrict cornering clearance. In addition, they do not provide any protection for the legs of the rider.

Enclosed motorcycles have been produced wherein mechanically operable outrigger devices have been provided for holding the machine upright when stationary. Actuation of such outrigger devices, to lower them or raise them when required, has been dependent upon the operation of a control by a rider of the machine. This requires the rider to modify his riding technique as a conscious effort is required to cause the outrigger to be deployed or retracted, unlike the natural instinct of a rider to lower his feet to the ground as he feels incipient instability of a motorcycle as it comes to rest.

SUMMARY OF THE INVENTION

It is broadly the object of the present invention to provide an arrangement of movable support members for a motorcycle having an enclosed body which is an improvement upon the arrangements above described. More particularly, it is an object of the present invention to combine the stabilising capability of movable support members with the provision of protection for the legs of a rider, both in respect of accident protection and weather protection.

According to one aspect of the invention, I provide a motor cycle having an enclosed body and respective support members at the sides of the motorcycle and movable downwardly relative to the body into engagement with the ground, wherein each support member is in the form of an open-topped enclosure for receiving a lower portion of the respective leg of the rider, and footrest means extends into such enclosure.

In a motorcycle according to this first aspect of the invention, the arrangement of the support members as open-topped enclosures movable downwardly into ground engagement relative to the body of the motorcycle, the footrest means extending into such enclosures, has the result that the support members to do not have to be disposed laterally outboard of the footrest means of the motorcycle. Thus the above described problem of support members positioned laterally outside the footrest means with consequent width and reduction of cornering clearance, is overcome. The support members can be placed much closer to the centre line of the motorcycle. By virtue of such disposition, the support members can be relatively wide and provide ample space for accommodating the lower legs and feet of the rider.

The support members may provide for accommodations of the lower legs and feet of the rider in front of, at the side of, or to the rear of the footrest means.

Preferably the footrest means comprise bar type footrests ("foot pegs"), but it would be within the scope of the invention for the footrest means to comprise platforms on which the rider's feet can be rested, although footrest means of this type would restrict the space available within the support members.

Controls of the motorcycle, e.g. brake pedal, gear change pedal, may be associated with the footrest means and disposed within the support members.

The support members are preferably movable within guiding formations in the body of the motorcycle which closely constrain the movement of the support members relative to the body and include means which provide a substantially weatherproof seal between the support members and body.

The support members may be pivotally connected to the body of the motorcycle, which pivotal connections are conveniently about a transverse axis which is spaced forwardly of the footrest means of the motorcycle so that portions of the support members in the region of such footrest means are movable relative to the body in an arcuate path.

Preferably the support members are spring biased to raised positions relative to the body of the motorcycle and are movable against such spring biasing, by the rider, to lowered positions when they are required to engage the ground.

There may be provided power operated means for moving the support members to their lowered positions when required by the rider. Such power operated means may be electrically, pneumatically, or hydraulically operated and may be controlled by switch means which preferably to provided in the support members and is operable by the rider when the rider's foot is moved from the footrest means when it is required to lower the support members. The power operated means may simply oppose the force exerted by the spring means on the support members, so that the movement downwardly of the support members is wholly or predominantly in response to force exerted thereon by the rider, or may augment the force applied by the rider.

The possibility that the power operated means for moving the support members may augment the force exerted by the rider is particularly valuable if the rider occupies a position relative to the motorcycle such that the rider is not able without assistance to exert sufficient force to maintain stability of the motorcycle under all conditions. This is more likely to arise if the rider is, instead of the upright position, common for conventional motorcycles and in which the weight of the rider is generally above his legs, in a semi-reclining or "feet first" riding position wherein the rider's feet are well ahead of his body.

The support members may be able to move forwardly relative to the body of the motorcycle in impact, such forward movement causing an absorption of energy. For example, the support members may engage a honeycomb, foam, or other energy absorbing means.

This provides additional protection for the legs of the rider in the event of an accident. If a motorcycle has an impact with another object, the legs of the rider move forward as the motorcycle decelerates. If the support members are able to absorb energy in moving forward, the possibility of injury to the rider from uncontrolled forward movement of the legs can be reduced. The interior of the support members should, of course, include energy absorbing material so that the rider's legs are not vulnerable to injury from uncontrolled impact with the support members.

If the support members are pivotable relative to the body of the motorcycle, the means by which they are pivotable mounted may be movable relative to the body, such movement causing associated deformation or destruction of energy absorbing material.

The support members may be provided with wheels, rollers or the like for engagement with the ground. Such wheels, rollers or the like may have drive means associated therewith which are able to be used for manoeuvring the motorcycle when it is supported by the support members, e.g. when it is being parked or garaged.

BRIEF DESCRIPTION OF DRAWINGS

The invention will now be described by way of example with reference to the accompanying drawings, of which.

DESIGNATION OF PREFERRED EMBODIMENTS

Figure 1:
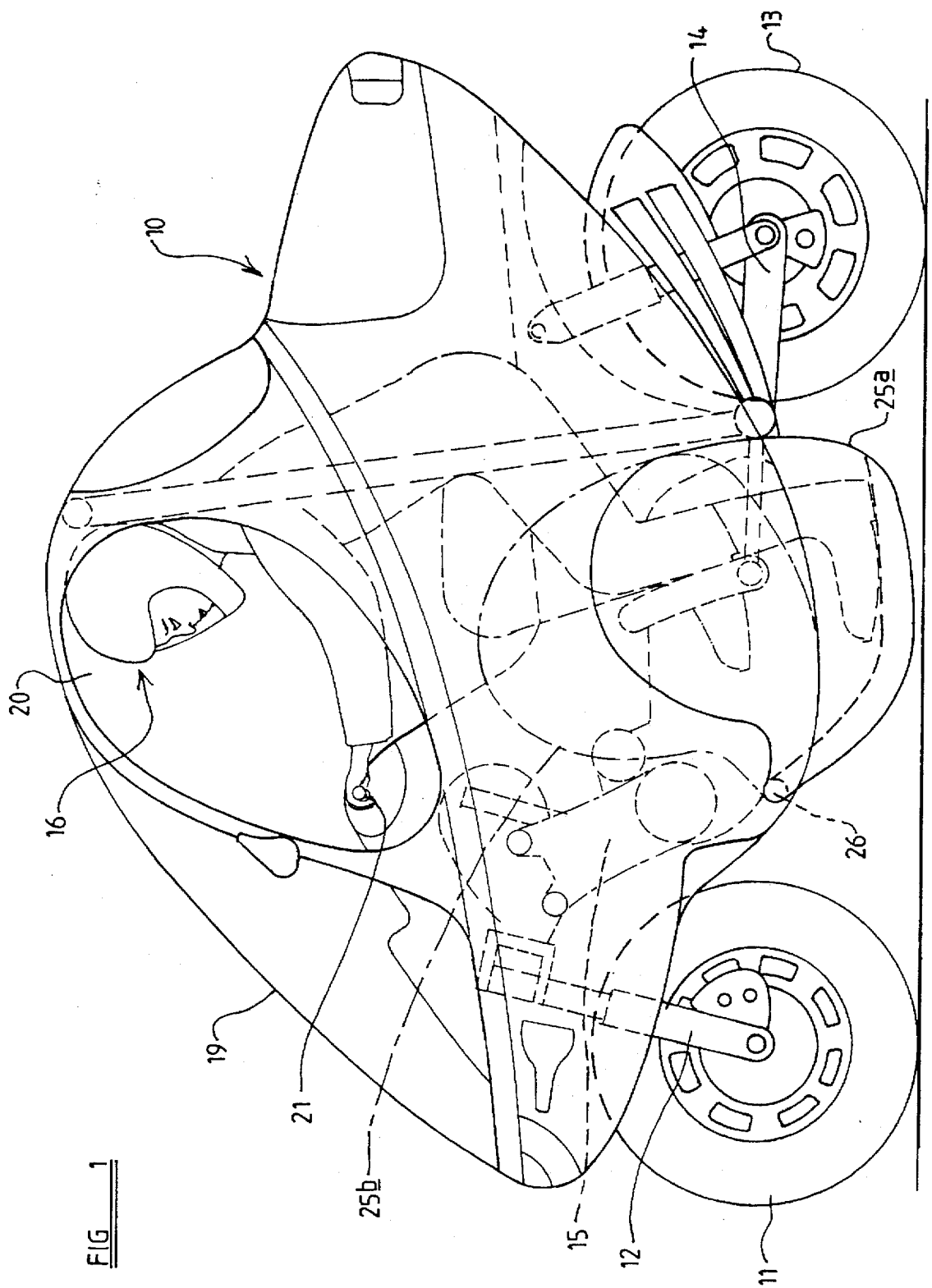
FIG. 1 is a diagrammatic side view, showing some internal detail, of a motorcycle according to the invention.
Figure 2:
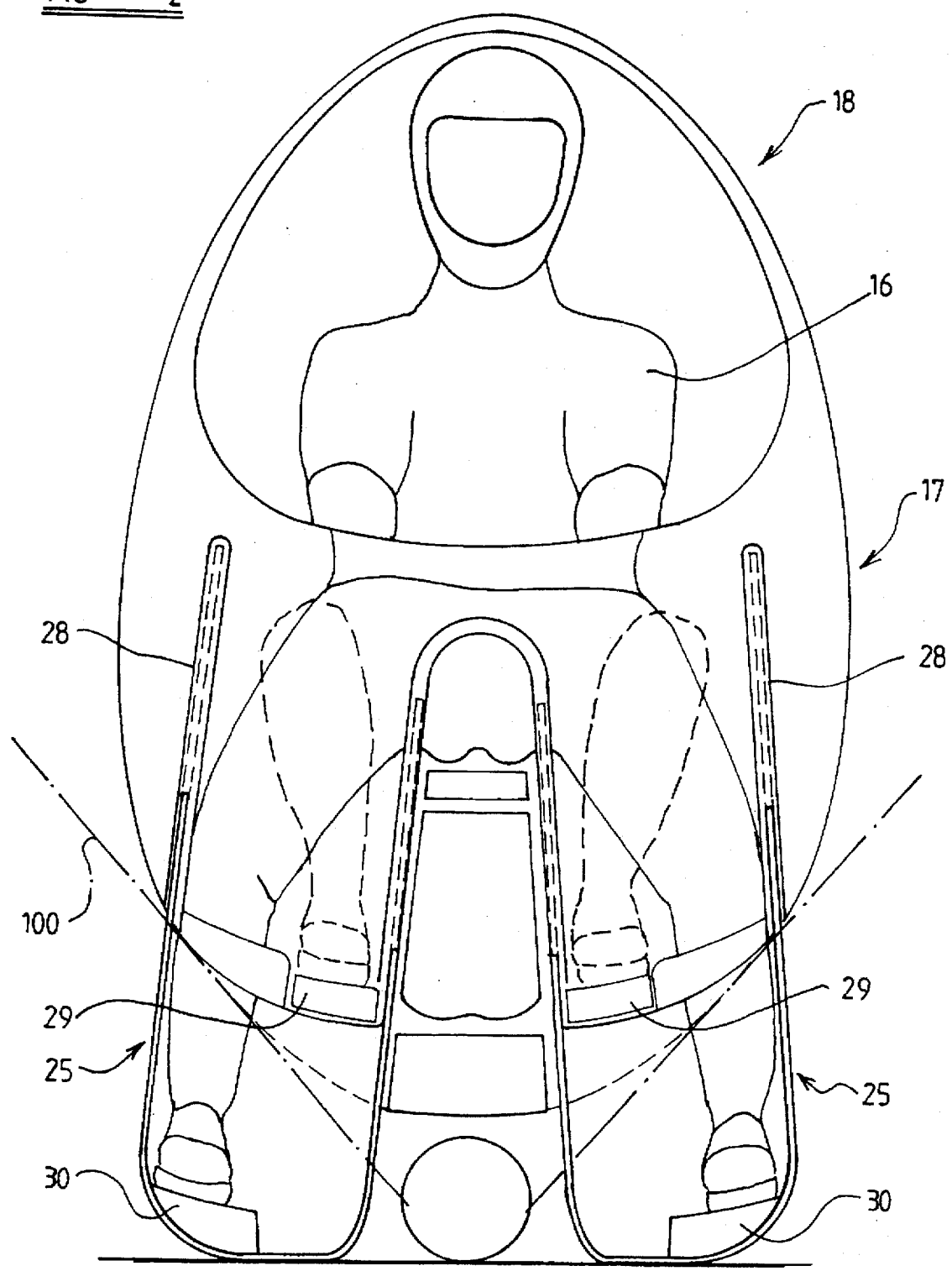
FIG. 2 is a transverse cross-section of the motorcycle of FIG. 1.
Figure 3:
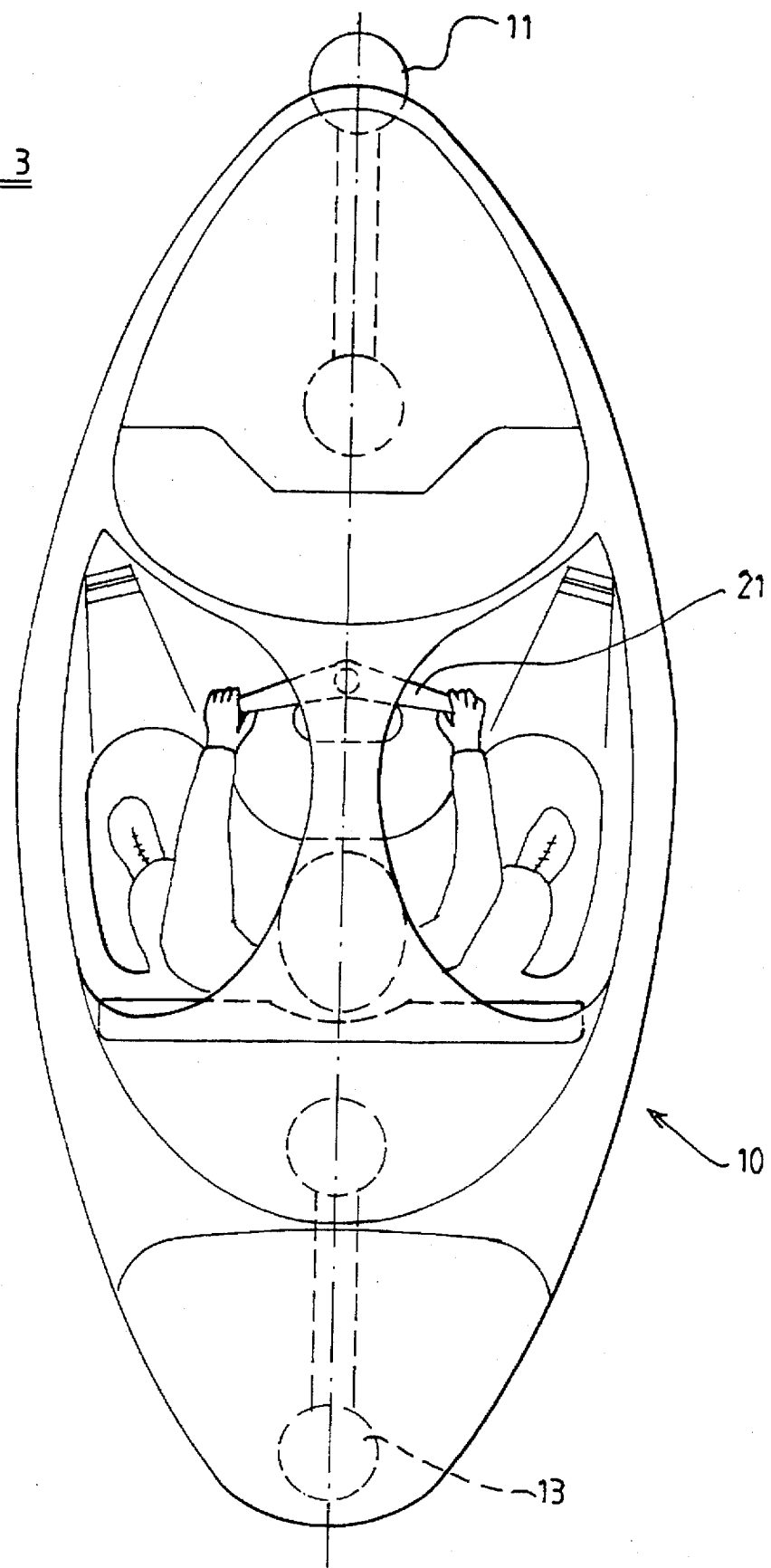
FIG. 3 is a view as shown in FIG. 2 showing a modified version thereof.
Figure 4:
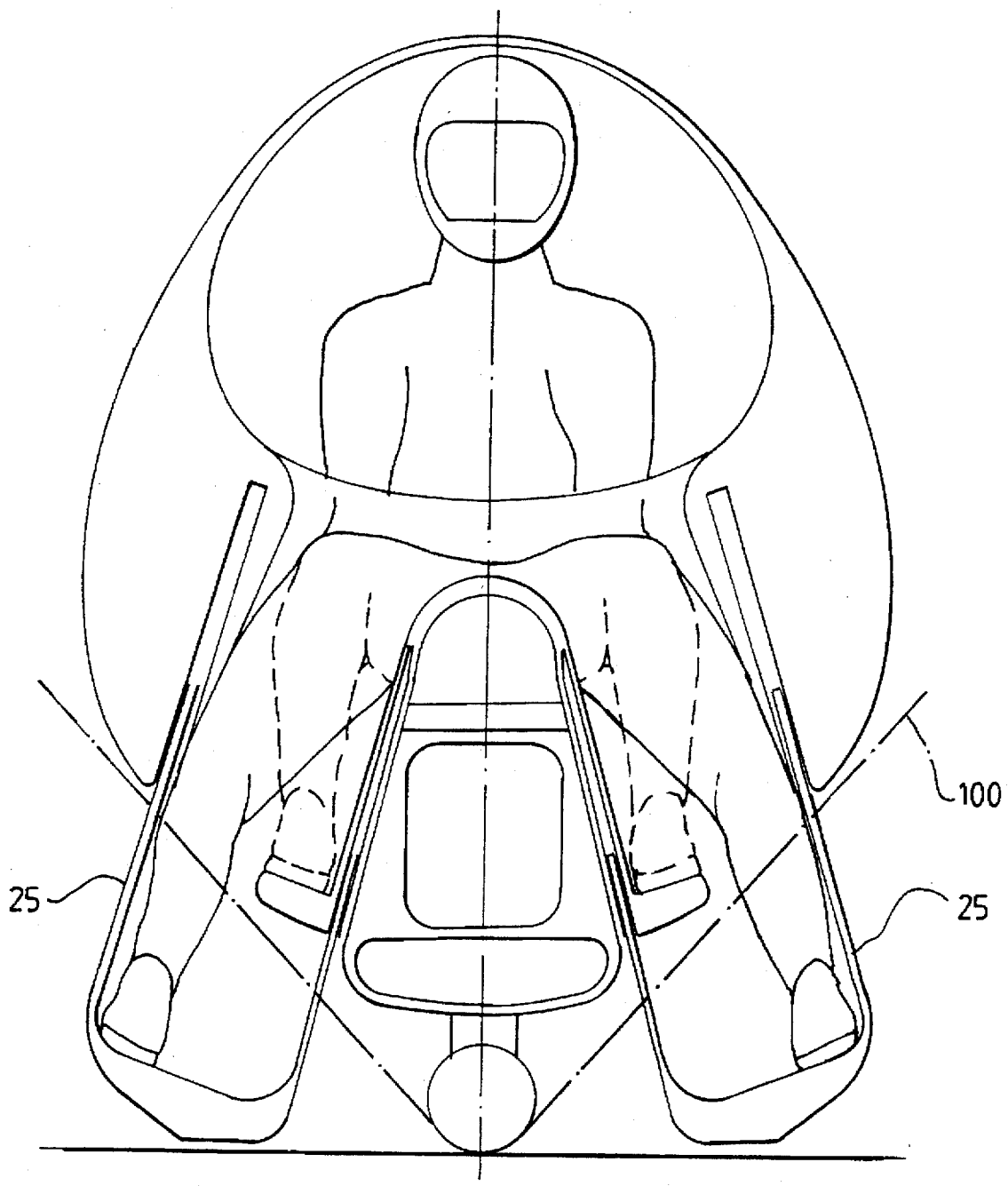
FIG. 4 is a plan view of the motor cycle.

Referring firstly to FIGS. 1, 2 and 4 of the drawings, these show in somewhat diagrammatic form a motorcycle which has a substantially totally enclosed body indicated generally at 10. The motorcycle has a front wheel 11 carried by a fork 12 and a rear wheel 13 carried by a pivoted arm or fork 14. The motorcycle has an engine 15 and a transmission means not shown for driving the rear wheel 13. The body 10 may itself be a load-carrying structure which supports items such as the engine and front and rear forks 12, 14, or the motorcycle may have a separate frame or chassis structure which is responsible for the bearing of all forces and loads and in relation to which the body 10 is a substantially non-load bearing structure, although it will be appreciated that in practice any body associated with a motor vehicle will be subject to loads and forces and must be able to withstand same. It is to be understood that, herein, when I refer to components being attached to or operative in relation to the body, this expression and analogous expressions are to be understood as extending to such components when attached to or operating in relation to the chassis or frame if such is provided.

The body 10 affords an enclosed or substantially enclosed compartment for accommodating a rider of the motorcycle as indicated at 16. The body provides an environment which protects the rider from adverse weather conditions and also provides a protective structure around the rider to prevent or minimise injury to the rider in the event of an accident. The body incorporates a lower portion 17 as described in greater detail hereafter in which the lower torso and legs of the rider are accommodated, and an upper portion 18 which includes a windshield 19 and an openable or removable canopy 20 which permits the rider to board the motorcycle. It will be appreciated that when I refer to the body of the motorcycle being totally or substantially totally enclosed, in practice there will be provision for ventilation and access for other purposes while the motorcycle is in use, e.g. by way of operable or removable windows or panels.

Within the lower portion 17 of the body 10 there is a seat for the rider, footrest means to be described in greater detail hereafter, support members to be described in greater detail hereafter, and controls associated with the footrest means operable by the rider in a manner conventional for motorcycles. Such controls may comprise a brake pedal associated with the footrest means on one side, usually the righthand side of the motorcycle, and a gear change pedal associated with the footrest means on the other side of the motorcycle. A handlebar 21 having further controls for the motorcycle is provided, and the handlebar is connected by a steering linkage to the front fork 12. A harness is provided for holding the rider in the illustrated seating position in the body of the motorcycle, to restrain the rider in case of an accident.

Because of the enclosure afforded by the lower part 17 of the body of the motorcycle, the rider is not able to place his or her feet on the ground to prevent the motorcycle from falling over when stationary or at low speed. Therefore the motorcycle is provided with support members constructed and arranged as described hereafter. One support member is provided at each side of the motor cycle, in an arrangement which is generally symmetrical about the fore and aft vertical centre plane of the motorcycle.

Each of the support members, as indicated generally at 25, is in the form of an open-topped enclosure which preferably, and as illustrated, is pivotably mounted at its forward end to the body of the motorcycle, for pivotable movement about a transverse axis 26. Rearwardly of such pivotal mounting, the support member is thus movable upwardly and downwardly relative to the body of the motorcycle in an arcuate path of movement. In FIG. 1 of the drawings, the illustrated support member is shown in an unbroken line at 25a in the lowermost position it is capable of assuming relative to the body 10 and in which it makes contact with the ground, and at 25b in the uppermost or fully retracted position it is able to assume relative to the body. An intermediate position is shown in broken lines. FIG. 2 shows the support members at both sides of the motorcycle in their uppermost and lowermost positions, and also shows that the upwardly extending inside and outside walls of the support members extend into elongate upwardly extending slot formations 28 provided in the body of the motorcycle. Also shown in FIG. 2 are the footrests 29 on which the rider's feet are placed when the motorcycle is moving, and, outboard of the footrests 29, formations 30 in the support members for engagement by the feet of the rider when the support members are required to be lowered to the ground.

FIG. 4 shows a view which is generally as FIG. 2 but shows a modification wherein the support members 25 are disposed at a greater inclination to the vertical than the support members in the embodiment of FIG. 2. The support members are able to contact the ground at a greater distance from the centre line of the motorcycle, and thereby enhance stability of the motorcycle when stationary, but when the support members are in their fully raised positions they still provide sufficient cornering clearance. In FIGS. 2 and 4, broken lines 100 indicate the cornering clearance provided for the respective embodiments of the motorcycle.

Figure 5:
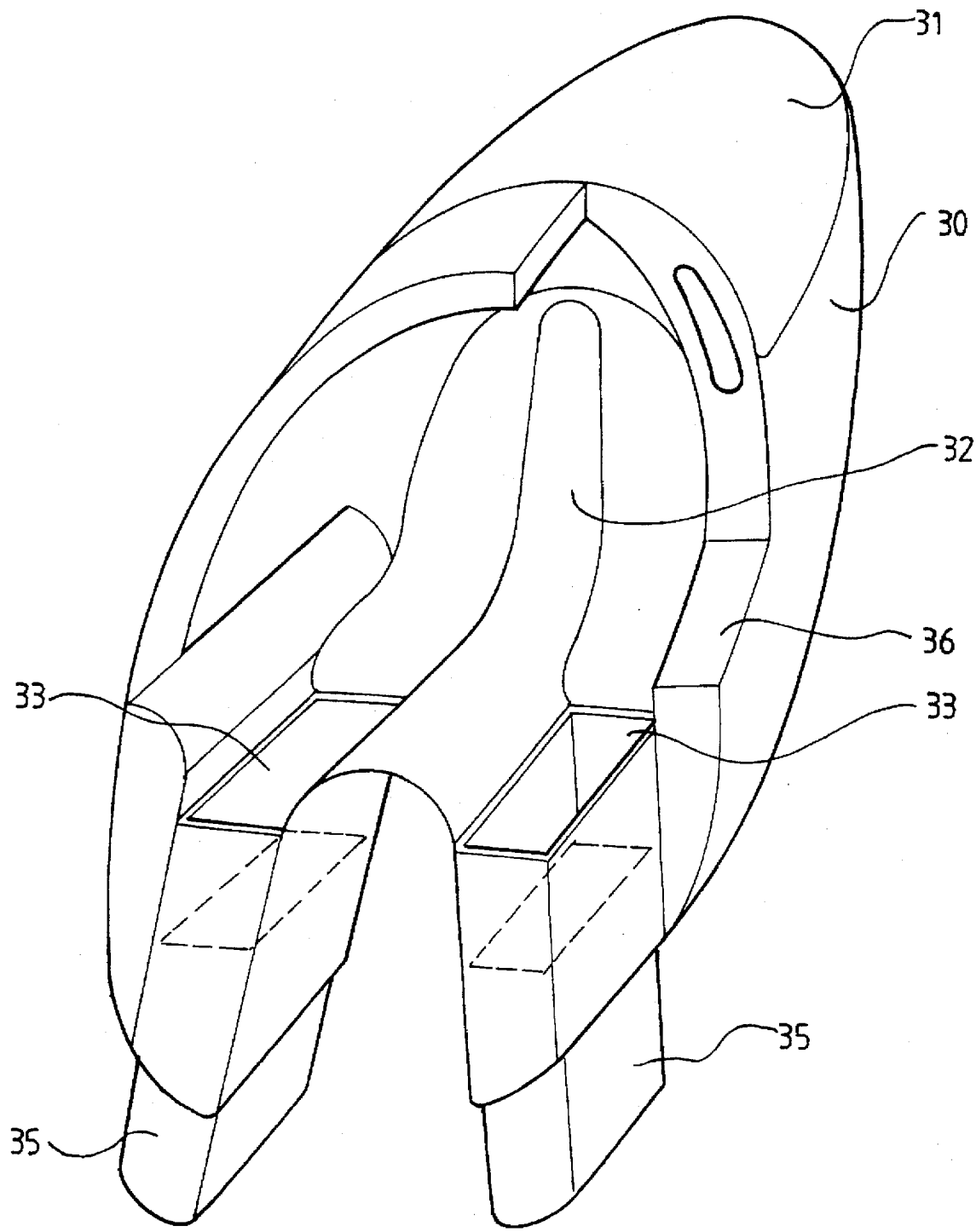
FIG. 5 is a diagrammatic perspective view of part of a motor cycle according to the invention.

Instead of the vertically extending walls of the support members being individually received in close fitting slot formations as shown at 28 in FIG. 2, the support members may as a whole be received in formations in the bodywork of the motorcycle which constrain the support members to a path of movement relative to the body and which provide for a weatherproof seal between the support members and body. FIG. 5 shows in a perspective view a possible configuration of the rear portion of the body of a motorcycle, and the support members therefor. In FIG. 5, from which the wheels and all other parts of the motorcycle have been omitted, the body is indicated generally at 30, and has a rear window 31. A seat 32 is provided in the body for occupation by a rider of the motorcycle, and for receiving the legs of the rider the body is provided with downwardly extending channels or slots 33. These are open at their lower ends and support members 35 are slidable upwardly and downwardly within the channels or slots 33. The support members 35 are in the form of open-topped enclosures and are arranged for ground engagement as above described. Suitable guide means will be provided for ensuring free movement of the support members within the channels or slots 33, and means for establishing a substantially weatherproof seal between the support members and the bodywork at the open lower ends of the channels or slots. It will also be noted in FIG. 5 that the body of the motorcycle, at least in its portions surrounding the rider, as shown at 36, are of a relatively thick impact absorbing material and/or construction.

Figure 6:
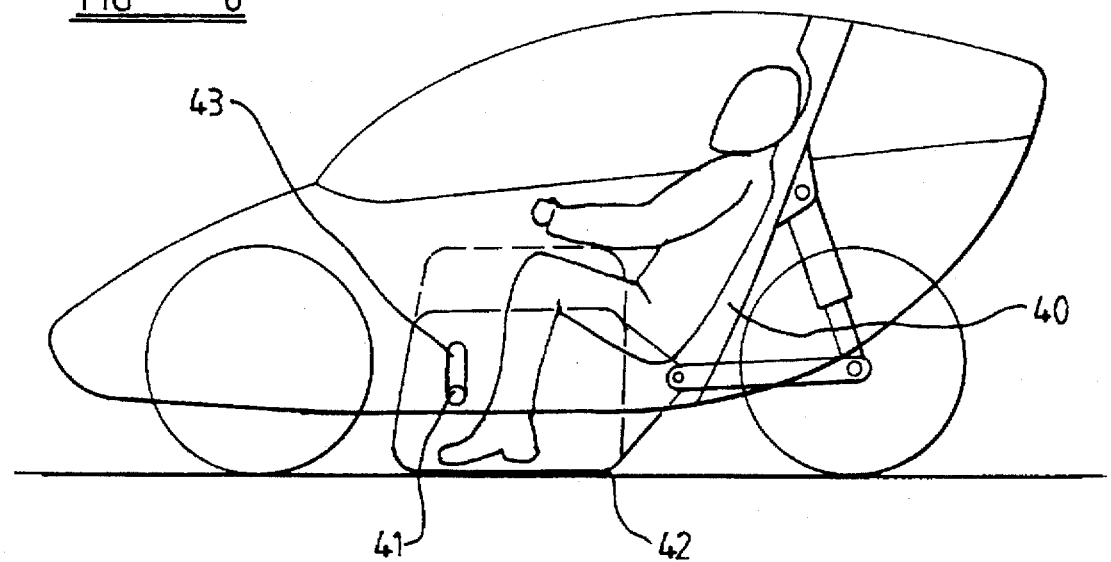
FIG. 6 is a lateral view, partly in section, of a further embodiment of motorcycle according to the invention.
Figure 7:
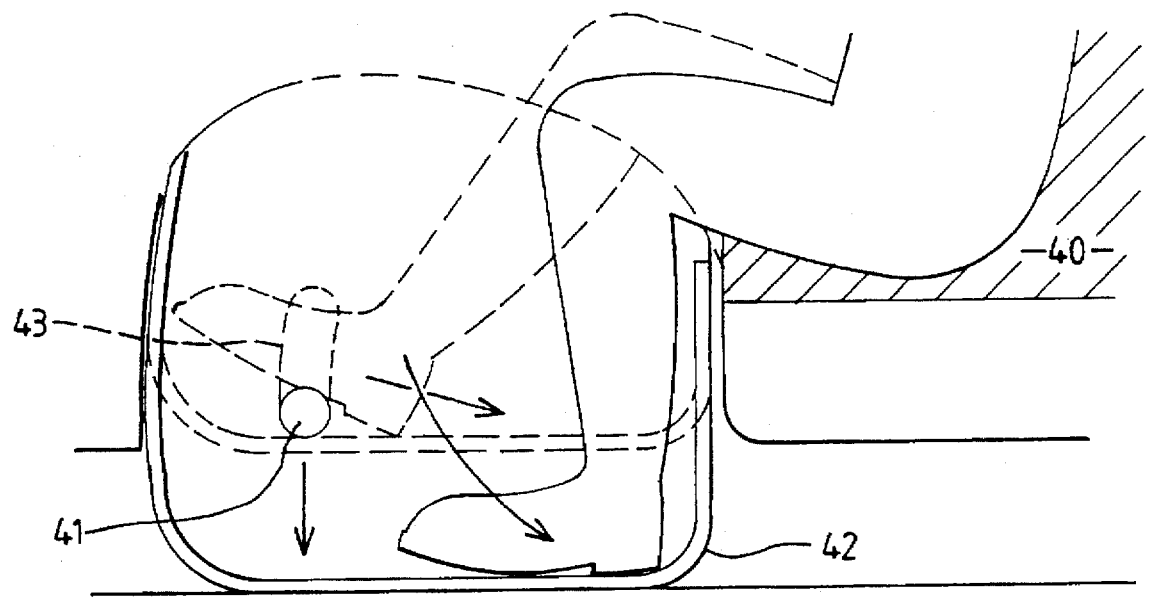
FIG. 7 is a diagrammatic elevation of a support member of a motorcycle according to the invention.

FIGS. 6 and 7 show, in outline and in slightly more detail, respectively, how support members according to the invention may be arranged in a motorcycle provided with a semi-reclining or "feet first" riding position. In FIG. 6, the seat and back support for the rider is indicated at 40 and it will be noted that the lower portion of the rider's back is virtually level with the axis of rotation of the rear wheel of the motorcycle. The footrests as indicated at 41 are disposed substantially forwardly of the seat 40, as are support members as indicated in outline at 42. It will be noted that footrests 41 protrude through vertically oriented slots 43 in the support members 42, to allow the generally vertical movement of the support members whilst the footrests remain stationary. Slots 43 may be linear if the support members are linearly movable or arcuate if the support members are pivotable.

FIG. 7 shows in greater detail the relationship between seat 40, footrest 41, and support member 42. When resting on footrest 41 the rider's lower leg is forwardly inclined, whilst when the rider moves his foot from the footrest to engage the support member for moving it downwardly, the rider's lower leg is nearly vertical.

Figure 8:
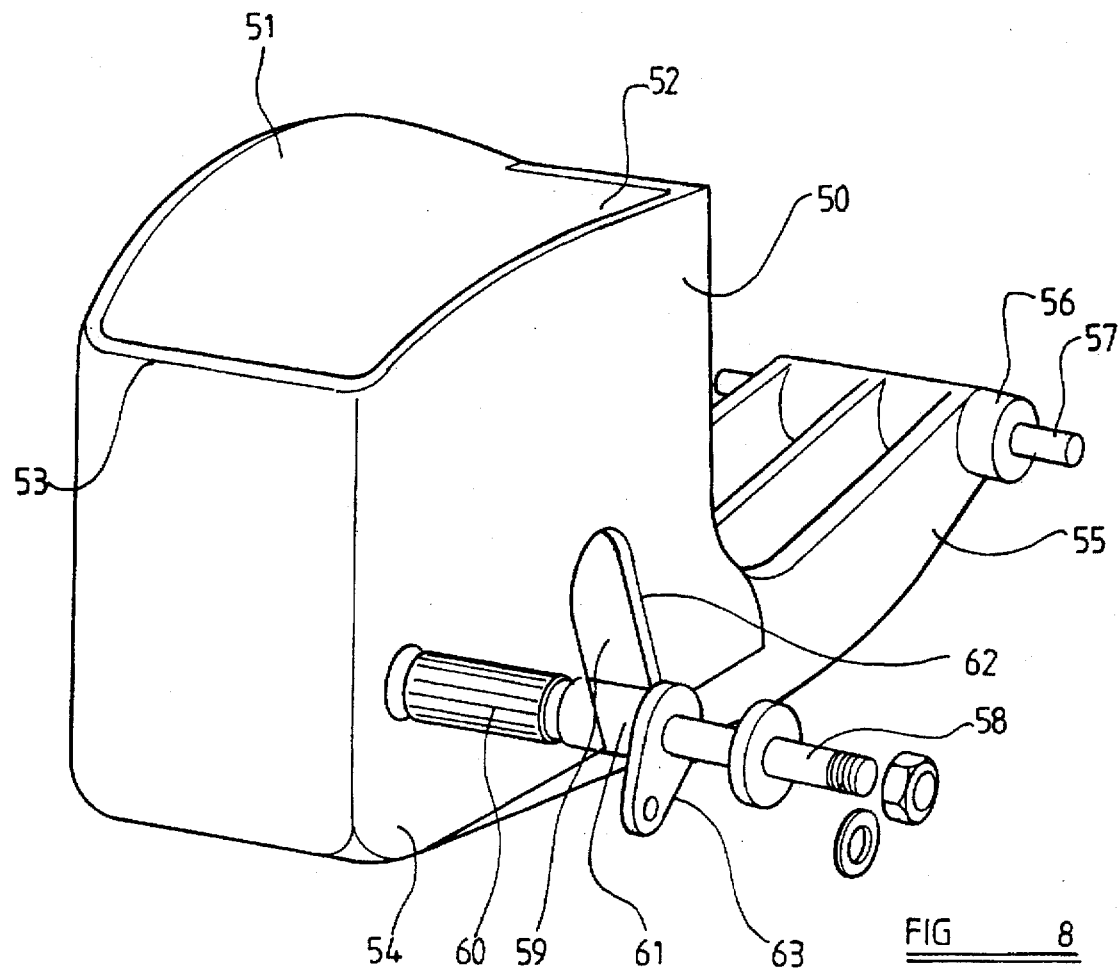
FIG. 8 is a perspective view of a support member.
Figure 9:
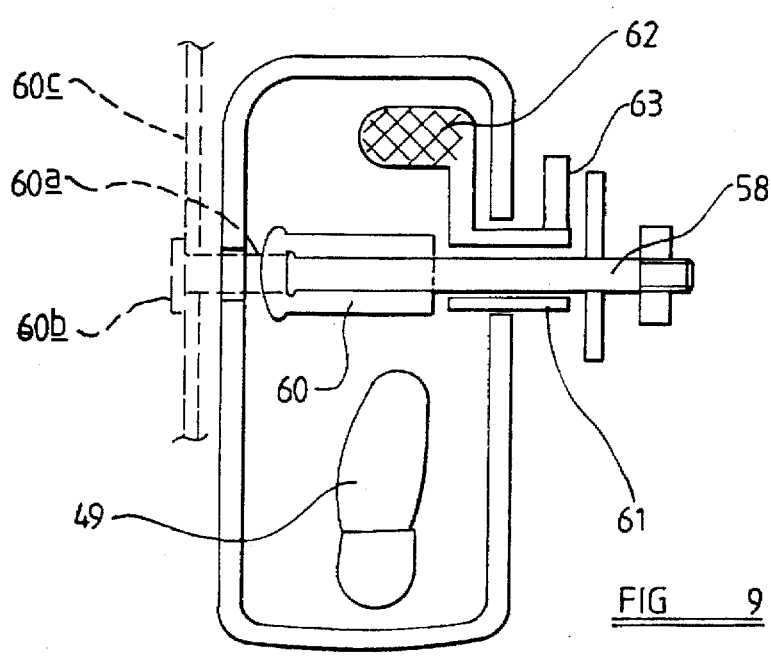
FIG. 9 is a plan view of a support member.

FIGS. 8 and 9 show, respectively, in partially broken-away perspective view and plan, one possible configuration of support member for a motorcycle according to the invention. In FIG. 8, the configuration of the support member as an open-topped structure with an inner wall 50, an outer wall 51, and front and rear walls 52, 53, respectively and a base 54 is clearly seen, together with a forwardly extending portion 55 leading to a sleeve 56 pivotable about a pivot pin 57 which is secured to the frame or body of the motorcycle. A footrest bar 58 is also secured to the frame or body of the motorcycle, and the footrest bar 58 extends through a vertically oriented slot 59 in the inner wall 50 of the support member, the extent of the slot 59 being sufficient to allow movement of the support member between its fully raised and fully lowered positions. Within the support member, the footrest bar carries a rubber sleeve 60 with a gripping surface, for the convenience of the rider to rest his foot on. A sleeve 61 is rotatable about the footrest bar in the region where it passes through the slot 59, and within the support member the sleeve 61 is connected to a foot operable control member 62. At the opposite side of the slot 59 in the wall 50 of the support member, the sleeve has a transverse arm 63 for connection to a part of the motorcycle which is intended to be operated by the control member 62, e.g. a gear change mechanism or possible a brake mechanism.

FIG. 9 illustrates that rearwardly of the footrest within the support member, there is sufficient space for a rider's foot to be placed at 49, when it is required to lower the support member to engage the ground.

Figure 10:
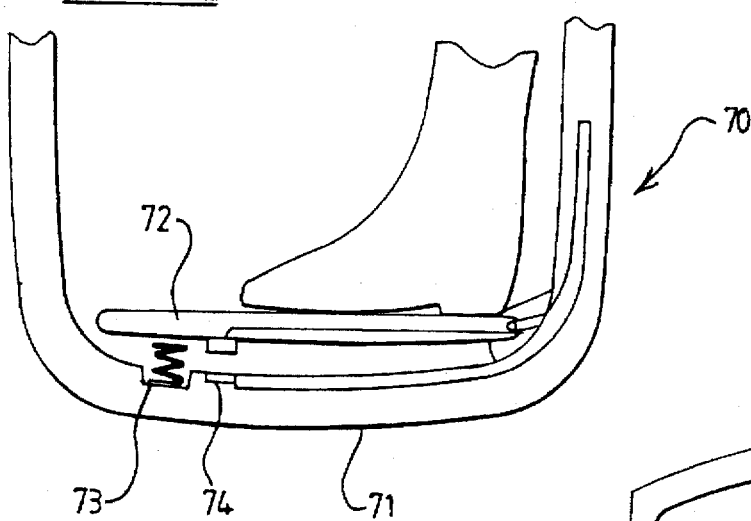
FIG. 10 is a side view showing detail of a support member.

Each of the support members is preferably spring biased to its uppermost position relative to the body of the motorcycle. The support members may be arranged to be pressed downwardly against such spring biasing by force exerted by the rider, or power operated means may be provided for causing or assisting such movement of the support members. FIG. 10 shows, diagrammatically, a support member 70 provided in its base 71 with a movable element 72 pivoted at one end to the support member and able to be depressed by the rider's foot against the action of a spring 73. When thus depressed, electrical switch means which as illustrated comprises contacts 74 but in practice will usually comprise a microswitch is operable to cause power operated means to be energised for lowering the support member.

Figure 11:
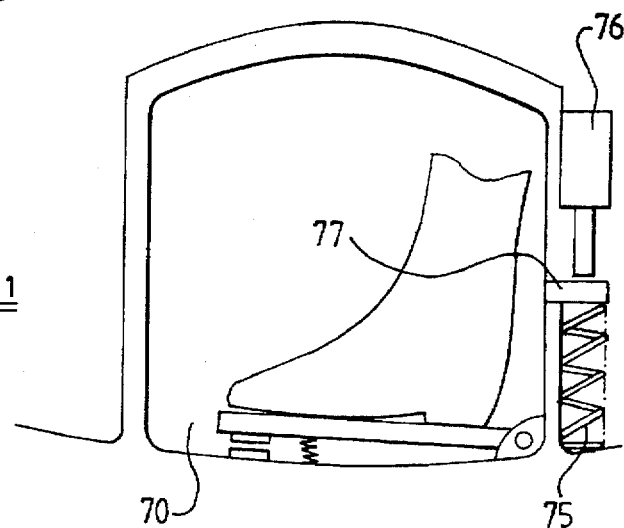
FIGS. 11 and 12 are diagrammatic side views showing further details of possible features of support members of a motorcycle according to the invention.

FIG. 11 shows the support member 70, a spring 75 for upwardly biasing the support member, and power operated means such as a fluid pressure operated piston cylinder device or an electrically powered device 76 to oppose the action of the spring 75 when the support member is to be lowered. The spring 75 and device 76 engage a bracket 77 provided on the support member. In the case of a fluid pressure, e.g. hydraulically operated device, a pump could be driven from the engine of the motorcycle for powering such device, or be powered from the electrical system of the motorcycle.

The support members may be provided with wheels, rollers or the like for engagement with the ground, to facilitate manoeuvring of the vehicle when it is supported by the support members. Such wheels or rollers may themselves be provided with means for driving them so that a rider of the motorcycle can move the motorcycle other than by the main propulsion engine thereof. Such drivable wheels or rollers may provide for moving the motorcycle rearwardly, as there are occasions when the rider of a motorcycle needs, by placing his feet on the ground and applying suitable force, to move a motorcycle backwards. Instead of wheels or rollers, the lower ends of the support members could be provided with pads of wear-resistant material.

Figure 12:
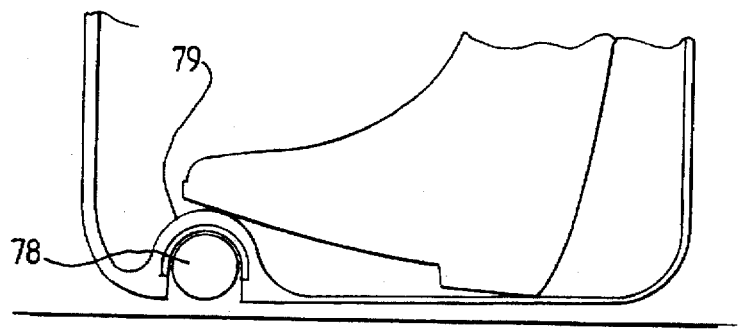
Figure 12:
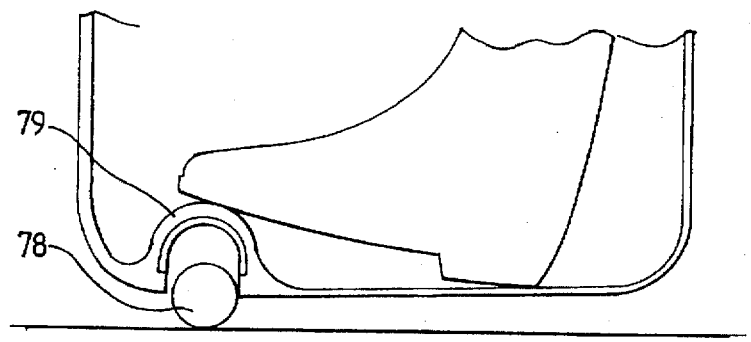

FIG. 12 shows, in two operative positions, a support member of a motorcycle equipped with a ground-engagable motorised roller 78. In FIG. 12, the motorised roller 78 is housed in a resilient housing 79 which is deformable when pressed upon by the rider of the motorcycle to cause the roller to engage the ground. An electric motor is provided for driving the roller, as is a clutch. Suitable control means operable by the rider may be provided to cause the roller to be driven when required, and in the required direction.

Figure 13:
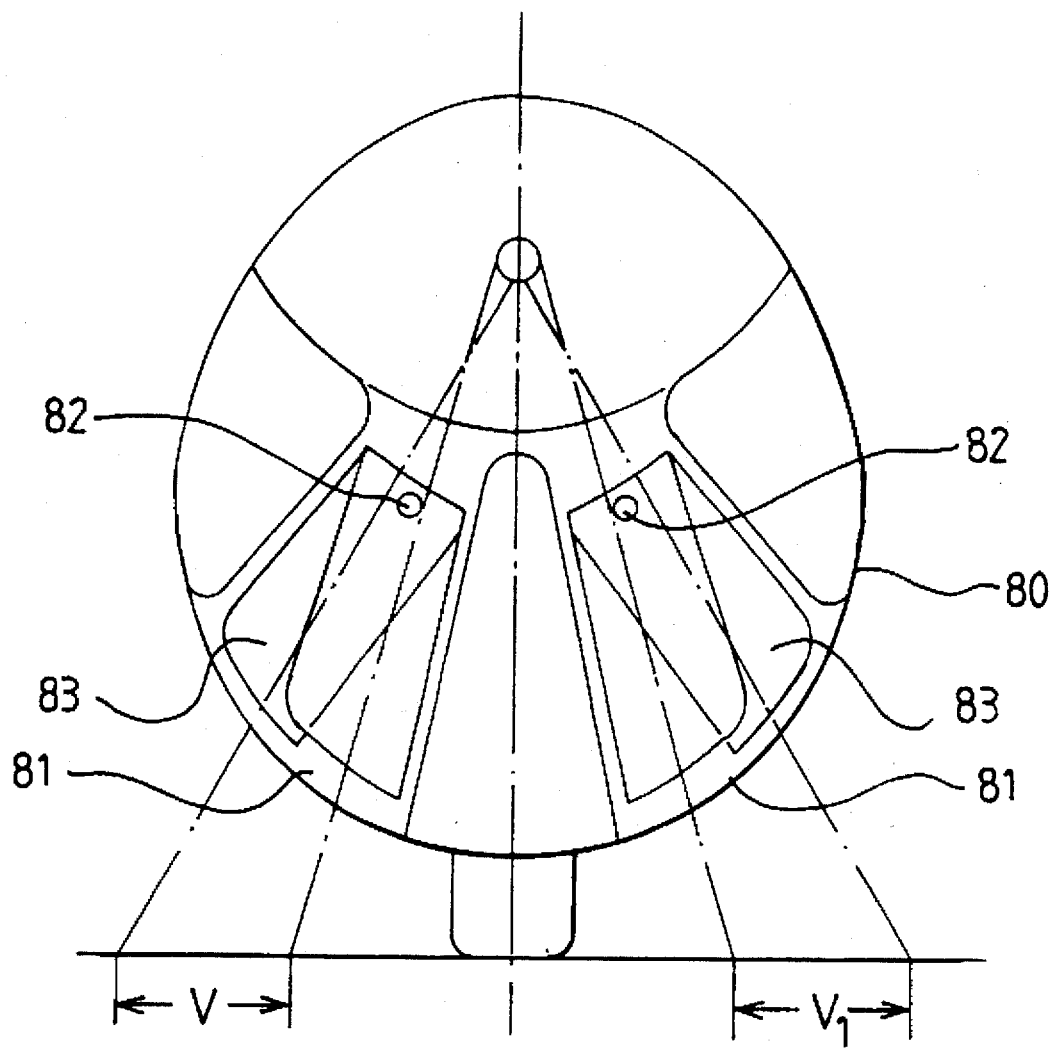
FIG. 13 is a transverse section through a further embodiment of motorcycle according to the invention.

FIG. 13 illustrates, in a transverse section through a motorcycle, how support members for the motorcycle may, in addition to being movable between raised and lowered positions, be movable laterally or otherwise relative to the body of the motorcycle. In FIG. 13, the body of a motorcycle is indicated at 80 and support members 81 are mounted for movement relative thereto between raised and lowered positions. The channels or slots in the body 80 within which the support members are movable are also pivotably movable about positions 82 at their upper ends, so that the support members can extend at a greater or lesser inclination to the vertical centre line of the motorcycle. Such movement may entail the compression of deformable material as indicated at 83, e.g. deformable foam rubber. By virtue of such provision, the support members may contact the ground at positions much more widely spaced apart than if the support members were movable upwardly and downwardly at a fixed orientation, and this enables the motorcycle to be rendered more stable when stationary. This allows the rider more flexibility in regard to positioning his legs as it gives extra space in which to move his thighs.

The bases of the support members may be given a degree of flexibility to enable them to adjust to the rider's foot position and/or the orientation of the ground surface they contact. Such flexibility may be provided by the use of flexible materials or by the use of non-rigid connection of the bases to the rest of the support members.

Although not specifically illustrated in any of the above referred to drawings, the support members of the motorcycle are preferably movable in the event of impact relative to the body of the motorcycle in the fore and aft direction, and forward movement thereof preferably involves the absorption of energy, e.g. by deformation of suitable energy absorbing material. In the event of an accident involving the motorcycle, where if a head-on impact occurs the rider's legs tend to be moved forward uncontrollably, such controlled forward movement of the support members involving energy absorption can significantly reduce the prospect of injury to the lower legs and feet of the rider. The support members are preferably provided internally with energy absorbing material which will be contacted by the legs and/or feet of the rider in the event of such an accident.

In a motorcycle according to the invention, in addition to the advantages above referred to, it will be noted that because the footrest means occupy the support members, the support members can be of relatively large dimensions so that there is ample space for the rider's lower legs and feet to be placed in front of, to the side of, or to the rear of the footrests when required, without increasing, particularly, the width of the motorcycle. Conventional foot controls can be incorporated.

Sealing devices, e.g. gaiters or concertina-type devices could be provided where the footrests and control extend through the slots into the support members.

The sliding action of the support members relative to the body of the motorcycle could be constrained by providing low friction material, e.g. PTFE, or the like on relatively sliding surfaces of the support members on the body, by linear bearings, or other means. Seals may be provided where the support members protrude from the body of the motorcycle, e.g. elements of soft and preferably low friction material.

Additional guide means may be provided from controlling the path of movement of the support members relative to the body of the motorcycle, and particularly to guide the support members such that they do not have any tendency to jam under deflections caused by contact with the ground. Such additional guidance may be provided by a telescopic strut or struts, a wishbone arrangement analogous to that used in vehicle suspensions, a "Watts linkage" guiding arrangement, or an arrangement utilising guide formations and rollers or sliders engagable therewith. If a telescopic strut is provided, which usually will require to be pivotably mounted at each end to the support member and to the body of the motorcycle, it will usually be arranged so that it is at its full extension when the support member is in ground contact, and if the support member is pivotably mounted it will be disposed at or adjacent maximum distance of the support member from the pivot thereof.

The footrests may provide additional guide means for movement of the support members relative to the body of the motorcycle. Where each footrest extends into the associated support member, through a slot in the wall of the support member, the footrest and support member may be configured to provide guidance for the support member and assist in reacting forces which are created when the support member contacts the ground.

Each foot rest may be extended so that it passes through a slot in the outermost wall of the support member. Where the footrest passes through the outer wall, it may as above described also assist in guiding the support member. In FIG. 9 there is illustrated, in broken lines at 60a such an extension of a footrest through a slot in an outer wall of a support member. There is also illustrated, at 60b how an end portion of the footrest may extend through and be connected to a wall 60c forming part of the body of the motorcycle. When this connection of the outermost end of the footrest is provided, it assists rigidity of the footrest and also of the body of the motorcycle.

Alternatively or in addition to such guidance of the support members by the footrests of the motorcycle, guidance of each support member may be assisted by a member or members at another part or parts of the support member, extending through a slot or slots in a wall of the support member. For example, a member may extend across each support member at the rear thereof, preferably in a portion of the support member which is separated from the portion of the support member in which the rider's leg and foot can be accommodated.

When a motorcycle according to the invention is to be parked, there may be provided means for locking the support members in their lowered positions. E.g. a lever-operated ratchet device could be provided.

It will be appreciated from the foregoing description that a motorcycle provided with support members according to the invention has significant advantages over arrangements previously proposed. In particular, as compared with outrigger devices which have to be operated by a rider as a conscious effort, support members according to the invention are operated by the rider as an automatic response to his instinctive support of the motorcycle as it comes to a halt. No new operating procedure has to be adopted or learnt, and in panic situations there is little risk of incorrect action. Any adjustment for differing heights of road surface as between the two sides of the motorcycle is automatically provided as the rider presses down on the support members.

From the point of view of safety of the rider, the support members according to the present invention constitute strong structures for protecting the legs and feet of the rider. As compared with the support members disclosed in my British patent aforesaid, which support members are essentially in the form of platforms only, there is a much greater degree of protection for the rider. Leg and foot movements required by the rider when the support members are to be deployed to support the motorcycle are not compromised or obstructed by the need to move them into the support members. In particular, in the present invention as compared with the previous proposal aforesaid, there is not the possibility of a rider's leg impacting against the edge of a footboard or footrest.

From the point of view of the rider, riding a motorcycle according to the invention is much more pleasant than in the case of a motor cycle equipped with separately operable outrigger devices. Because he or she does not have to worry about operation of outriggers, the rider is more relaxed and attentive to traffic conditions. His or her operation of the motorcycle is instinctive, as for conventional open motorcycles.

The features disclosed in the foregoing description, or the following claims, or the accompanying drawings, expressed in their specific forms or in terms of a means for performing the disclosed function, or a method or process for attaining the disclosed result, as appropriate, may, separately or in any combination of such features, be utilised for realising the invention in diverse forms thereof.

We claim:

1. A motorcycle, comprising:
   a. a body having a longitudinal center line and at least partially defining an enclosed space for receiving a rider of said motorcycle;
   b. a footrest connected to said body;
   c. a first support member disposed to one side of said center line and a second support member disposed to the other side of said center line, each said support member forming a lower body enclosure having an open upper end through which a leg of the rider can be placed into said support member, said footrest extending at least partially into said support member, said support member providing for the accommodation of the leg and foot of the rider when the foot of the rider is positioned other than above said footrest;
   a transmission and a brake,
   d. a controller for said motorcycle provided at said footrest, wherein said controller controls at least one of the group consisting of the speed, transmission, and brake of said motorcycle; and
   e. said support member arranged with respect to said body and said footrest for movement upwards and downwards independently of said footrest relative to said body between an upper position and a lower position.

2. The motorcycle of claim 1 further comprising guiding formations disposed in said body with a substantially weatherproof seal between said support member and said body.

3. The motorcycle of claim 1, wherein said support member is pivotally connected to said body.

4. The motorcycle of claim 3, wherein said pivotal connection operates about a transverse axis spaced forwardly of said footrest so that a portion of said support member proximate to said footrest moves along an arcuate path relative to said body.

5. The motorcycle of claim 1 wherein said support member is resiliently biased to said upper position and movable against said biasing by the rider to said lower position.

6. The motorcycle of claim 5, further comprising a motor for moving said support member from said upper position to said lower position.

7. The motorcycle of claim 6 further comprising a switch for controlling said motor, said switch operated by the rider.

8. The motorcycle of claim 6 wherein said motor is augmented by force applied by the rider to said support member.

9. The motorcycle of claim 3, wherein said pivotable connection absorbs energy by moving relative to said body.

10. The motorcycle of claim 1 wherein said support members are provided with wheels for engagement with the ground.

11. The motorcycle of claim 1 wherein said body provides a feet first riding position for the rider.

12. The motorcycle of claim 1 wherein said footrest comprises a bar-type footrest, said bar-type footrest extending into said support member through a slot in said support member, said slot providing for the relative movement between said support member and said bar-type footrest.

13. The motorcycle of claim 12 wherein said bar-type footrest and said slot cooperate to provide guidance for said support member in said relative movement.

14. The motorcycle of claim 12, wherein said footrest extends across said support member and through two slots in said support member, said slots formed in opposing sides of said support member.

15. The motorcycle of claim 7 wherein said motor is augmented by force applied by the rider to said support member.

16. The motorcycle of claim 6, further comprising a hydraulic piston cylinder powered by said motor for moving said support member from said upper position to said lower position.

17. The motorcycle of claim 1, wherein said controller forms an integral part of said footrest.

18. A motorcycle having a transmission, a brake, a signal light and a headlight comprising:
   a. a protective body that at least partially encloses the rider, said body having a longitudinal center line;
   b. a footrest connected to said body;
   c. a movable support member that defines an enclosure with an open upper end for receiving the leg of the rider mounted on each side of the longitudinal center line of said body, said footrest extending at least partially into said support member, said support member providing for the accommodation of the leg and foot of the rider when the foot of the rider is positioned other than above said footrest;
   d. a controller provided at said footrest for controlling at least one of the group consisting of the speed, transmission, brake, signal light and headlight of said motorcycle; and
   e. said support member arranged with respect to said body and said footrest to be moveable upwards and downwards independently of said footrest relative to said body between an upper position and a lower position.

* * * * *

UNITED STATES PATENT AND TRADEMARK OFFICE
CERTIFICATE OF CORRECTION

PATENT NO. : 5,685,388

DATED : 11 November 1997

INVENTOR(S) : Peter William BOTHWELL et al.

It is certified that error appears in the above-identified patent and that said Letters Patent is hereby corrected as shown below:

| Column | Line | |
|---|---|---|
| 2 | 10 | Change "accommodations" to --accommodation--. |
| 2 | 45 | After "preferably" change "to" to --is--. |
| 3 | 15 | Change "pivotable" to --pivotably--. |
| 4 | 26 | Change "operable" to --openable--. |
| 6 | 24 | Change "possible" to --possibly--. |
| 7 | 63 | Change "control" to --controls--. |
| 8 | 6 | Change "from" to --for--. |

Signed and Sealed this

Nineteenth Day of May, 1998

Attest:

BRUCE LEHMAN

*Attesting Officer*  *Commissioner of Patents and Trademarks*